United States Patent [19]
Corcoran

[11] Patent Number: 5,979,827
[45] Date of Patent: Nov. 9, 1999

[54] PROGRESSIVE G-FORCE ALIGNMENT PLATFORM FOR HIGH PERFORMANCE AERIAL AND SPACEBORNE VEHICLES

[76] Inventor: Bruce Alan Corcoran, 4342 Hadley Ave. N., Oakdale, Minn. 55128

[21] Appl. No.: 09/064,240

[22] Filed: Apr. 23, 1998

[51] Int. Cl.⁶ .................................................. B64D 11/06
[52] U.S. Cl. ................................ 244/122 R; 244/122 AG
[58] Field of Search ........................... 244/122 R, 122 AG

[56] References Cited

U.S. PATENT DOCUMENTS

| | | | |
|---|---|---|---|
| 2,304,781 | 12/1942 | Dillon | 244/122 R |
| 3,981,465 | 9/1976 | Sinnett et al. | 244/122 A |
| 4,004,763 | 1/1977 | Bunnell et al. | 244/122 R |
| 4,243,024 | 1/1981 | Crosbie et al. | 128/1 A |
| 4,301,983 | 11/1981 | Horan | 244/122 R |
| 4,787,576 | 11/1988 | Mc Grady et al. | 244/122 R |
| 4,923,147 | 5/1990 | Adams et al. | 244/122 AG |
| 5,064,146 | 11/1991 | Tung | 244/122 R |
| 5,152,479 | 10/1992 | Ash et al. | 244/122 R |

*Primary Examiner*—Charles T. Jordan
*Assistant Examiner*—Vagnola Khamvongsa Comer
*Attorney, Agent, or Firm*—Schwegman, Lundberg, Woessner & Kluth PA

[57] ABSTRACT

The present invention includes a device for enabling a pilot to maintain a conscious state at a high G-force. The device comprises a platform and seat radially movable about an axis. The device also comprises a mechanism for moving the platform in order to optimize the position of the pilot with respect to the G-force so that the pilot is conscious.

14 Claims, 5 Drawing Sheets

PROGRESSIVE G-FORCE ALIGNMENT PLATFORM FOR HIGH PERFORMANCE AERIAL AND SPACEBORNE VEHICLES

BACKGROUND OF THE INVENTION

The present invention relates to a device for enabling a pilot to maintain a conscious state while flying an aircraft at high G-forces.

Existing manned high performance vehicles are limited to the ability of the pilot to withstand the effects of accelerative G-forces on the human body. G-forces are the result of gravity and the pull against this force. For the sake of discussion, 1 G is equal to the earth's gravitational pull. 2 G's is equal to two times the earth's gravitational pull, etc. Present day methods of counteracting these effects rely on pilot straining techniques and advances anti-G pressure suits. This allows the pilot to withstand accelerative G-forces along the Gz (+) axis during advances positive G-force maneuvers only (Ref. FIG. 1, 12).

During high positive Gz (+) maneuvers, blood in the human body rushes toward the feet of the pilot. The higher the G-force, the less time the pilot can experience this before "blackout" unconsciousness occurs. The most modem anti-G suits today limit a pilot to just beyond 9 G's for just seconds prior to blackout. Each human is variable with respect to blackout time rates, as an experienced pilot will be able to experience the force longer than an inexperienced one.

In combat, the ability to withstand higher G-forces for longer periods of time results in advanced maneuverability that enemy aircraft may not be able to keep up with. Furthermore, the advent of missile technology limits the survivability of an aircraft during combat because the missile can maneuver at far greater G-forces than what a human pilot can withstand with use of existing technology.

The highest G-force a human has voluntarily withstood and survived was on a water braked rocket sled at Holloman Air Force base in New Mexico, May 16, 1958. The G-force endured was 82.6 G's for 0.04 seconds. This G-force occurred along the Gx (+) axis. The ex-Soviet Union has reported that a man could withstand 26.5 G's without blackout at an inclination of 80 degrees to the direction of acceleration. This is approximately along the Gx (+) axis. It is apparent that the human body can withstand far greater G's when "aligned" with the Gx (+) axis. For the human body, this is the preferred medical angle (PMA) for withstanding accelerative G-forces.

SUMMARY OF THE INVENTION

This invention dynamically and progressively aligns the human body during flight to position the pilots "PMA" to match the direction of accelerative force during any maneuver. Therefore, instead of being limited to just 9 G's, the pilot will be limited to the 26.5 G range. Data from an onboard computer will calculate the vectored accelerative G-forces while in dynamic flight from multiple sensor inputs. The computer will then command the pilot's seat to move along a 3-axis rotational spherical realm and dynamically match the pilots "PMA" to the accelerative G-force.

BRIEF DESCRIPTION OF THE DRAWINGS

The following is a description of the appended drawings. This, along with the following description of a preferred embodiment can explain the invention clearly.

DETAILED DESCRIPTION

It is the objective of this invention to control G-forces during flight, rather than try to counteract them. It is another objective of this invention to render it unnecessary for the pilot to wear an anti-G suit, since these suits are uncomfortable and limit the maneuverability of the pilot to control the aircraft. It is an additional objective of this invention to increase the threshold of pilot G-force limits form the 9 G range to the 26.5 G range. It is a further objective of this invention to introduce pre-planned pilot controlled maneuvering into the G-force alignment platform.

Figure 1:
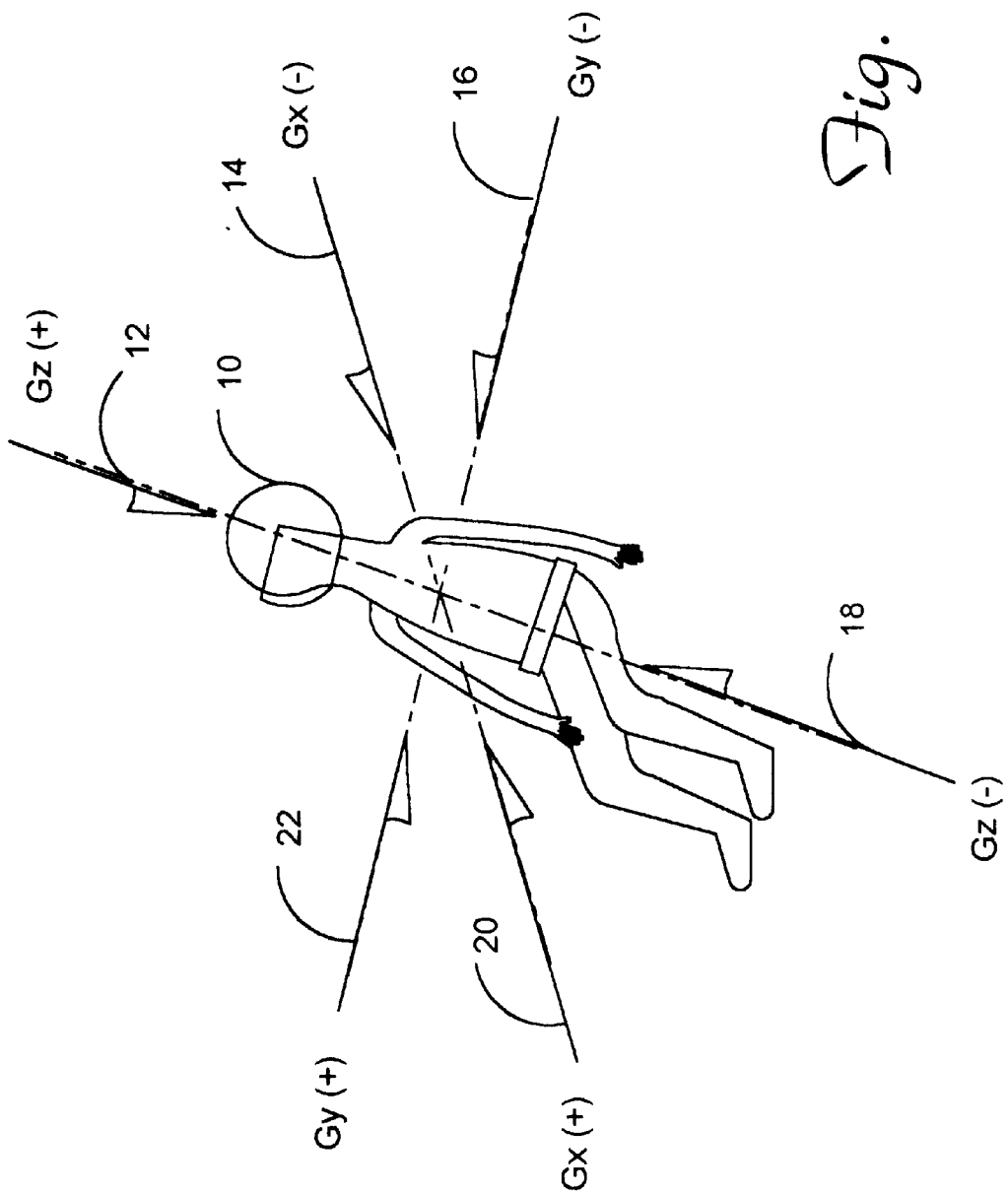
FIG. 1 is a schematic view of the G-force axis as it pertains to the human body.
Figure 2:
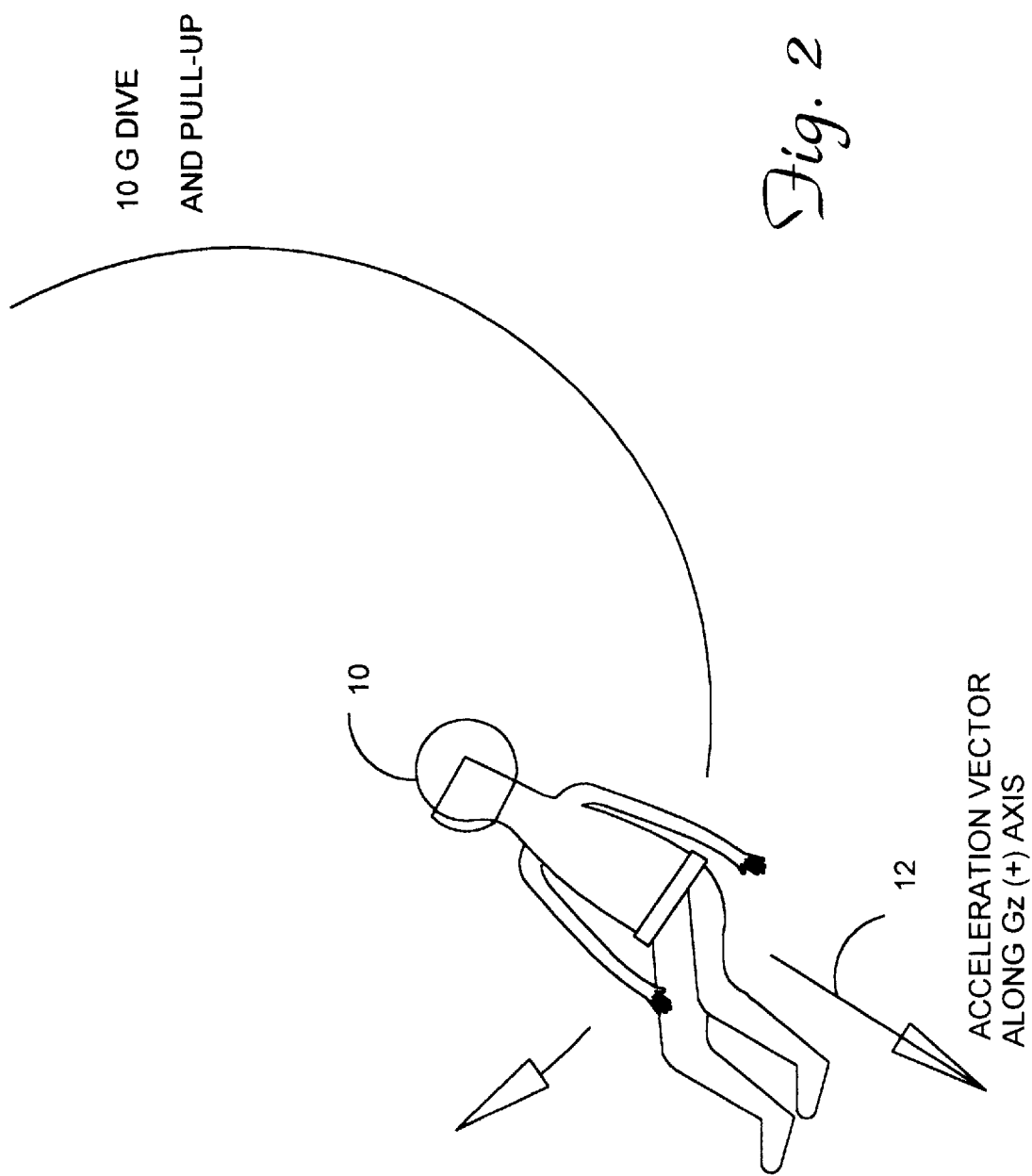
FIG. 2 is a schematic view of a typical positive G high performance maneuver, and the positioning of the pilot via. conventional seating within the aerial vehicle.
Figure 3:
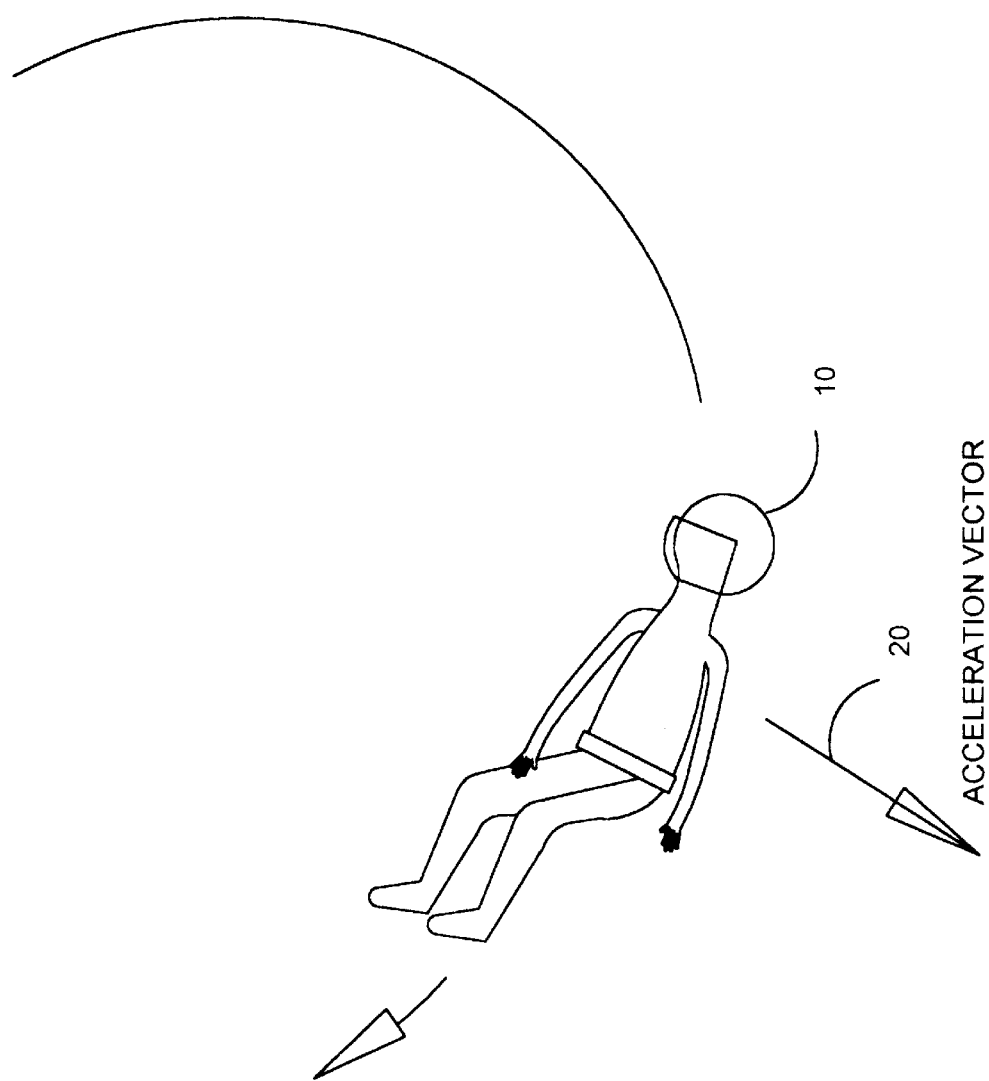
FIG. 3 is a diagram of the same high performance maneuver as that in FIG. 2, except that the pilot has been "aligned" along the more favorable Gx (+) axis.

Referring to FIG. 1, we see the axis of the G-forces as they pertain to the human body 10. Any acceleration along the Gz (+) axis results in blood flowing to the feet of the human 10. Any acceleration along the Gz (−) axis and blood rushes to the brain. Both these situations are what pilots are currently enduring in high performance maneuvers. If position of the accelerative G-force matches near the Gx (+) axis, the human 10, has a more neutral blood flow and can correspondingly withstand greater G's. This is the heart of the invention. Since no matter which direction the accelerative G-force may be coming from, the invention pivots the pilot to "align" the PMA with the accelerative G-force. Referring to FIG. 2, we can see a high performance 10 G dive and corresponding pull-up. The human 10, is seated in a conventionally equipped aerial vehicle and is at the high G part of the maneuver. The accelerative vector 12, is oriented along the Gz (+) axis and therefore blood is flowing towards the human's feet 10. A human in this position will black-out. Referring to FIG. 3, the human 10, has been dynamically "aligned" to position the Gx (+) axis 20, of the human 10, with the accelerative G-force at this point in the maneuver. Data from multiple in flight sensors is obtained to determine the accelerative G-force vector. This is continually tracked by the alignment platform control computer which dynamically and progressively aligns the human body during flight to position the pilots preferred medical angle of accelerative G-force acceptance, "PMA", to match the direction of accelerative force during any maneuver. Therefore, instead of being limited to just 9 G's, the pilot will be limited to the 26.5 G range. The alignment platform control computer will then command the pilot's seat, attached to the 3-axis dynamic rotational platform, to move along a 3-axis rotational spherical realm and dynamically match the pilot's "PMA" to the accelerative G-force vector. Since this "alignment" has been achieved with matching the PMA to the accelerative G-force, the human 10, can withstand greater G's (26.5 G's without blackout). Since the human is dynamically "aligned" with any accelerative G-forces, blood will not be abnormally displaced toward the brain or the feet, therefore not requiring the pilot to wear an anti-G suit.

Figure 4:
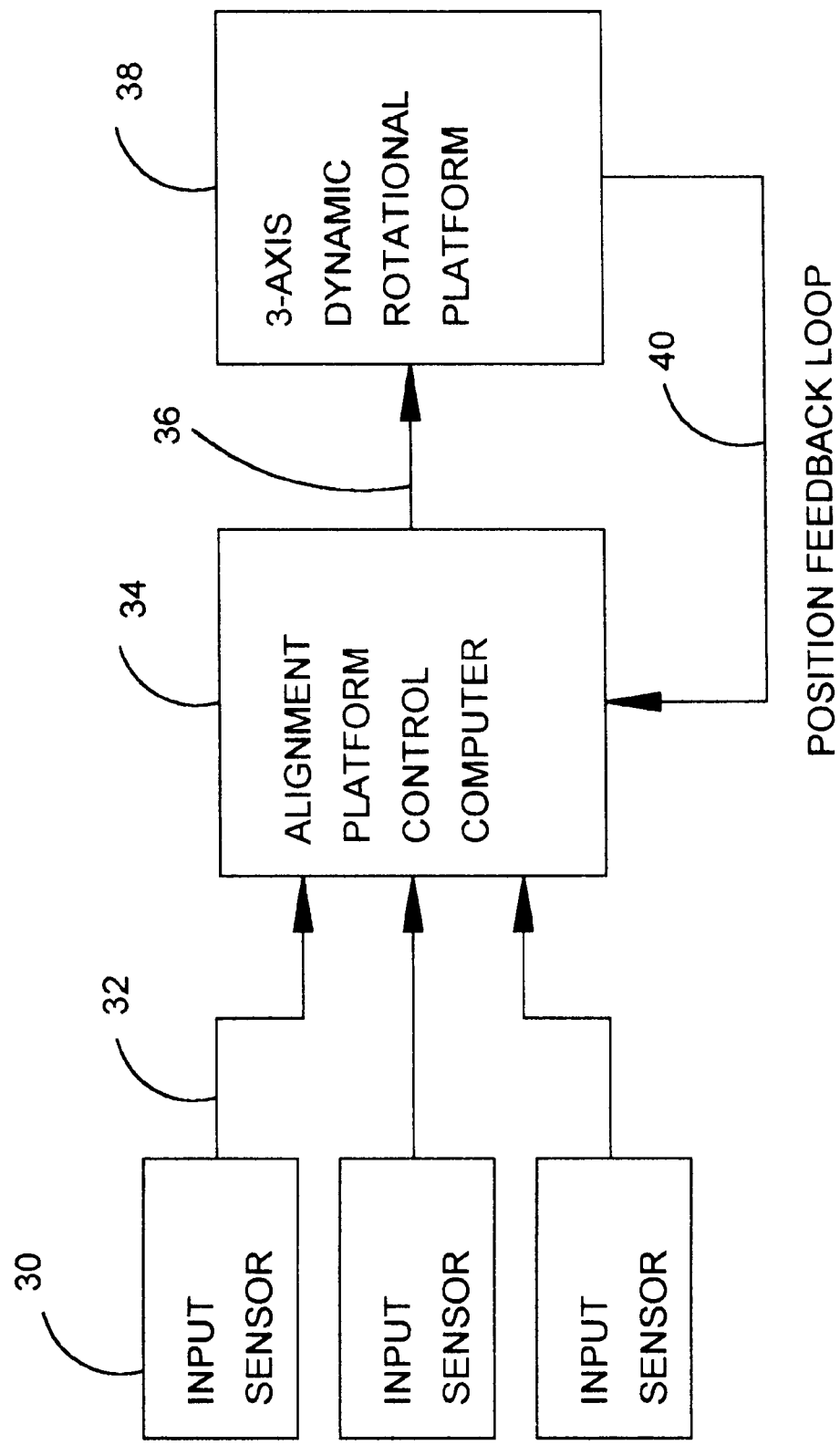
FIG. 4 is a functional block diagram of the invention's control loop for the 3-axis alignment platform.
Figure 5:
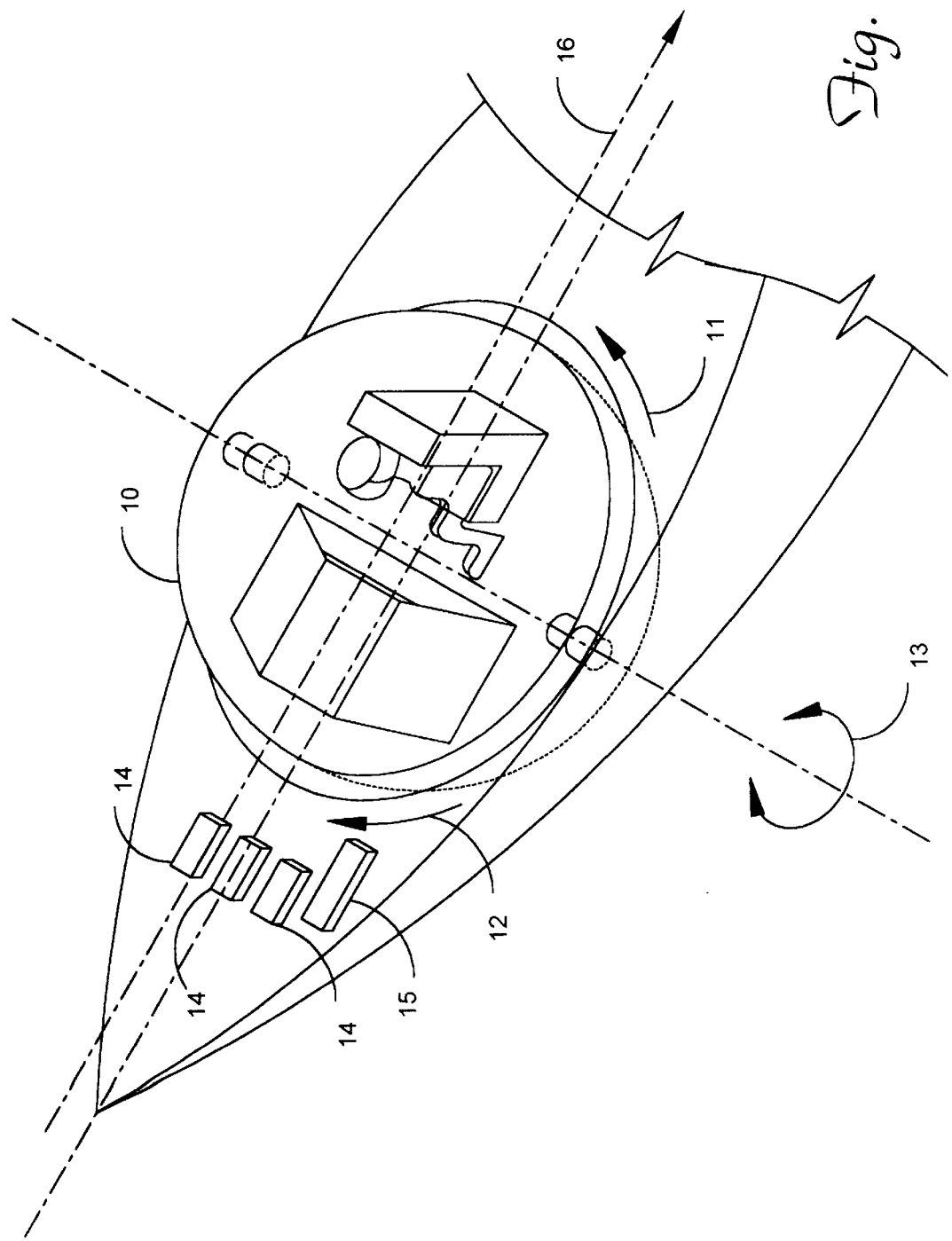
FIG. 5 is a perspective view of one embodiment of the alignment platform of the present invention.

This dynamic progressive G-force "alignment" can be better understood by referring to FIG. 4. Input sensors 30, obtain information on where the G-force acceleration vector is at and whether it is currently moving within 360 degree spheroidal space. These sensors 30, send this information 32, to the alignment platform control computer 34. Data is processed, continually updated from the sensors and an accelerative G-force vector is determined within the 360 degrees of spheroidal space around the aerial or spaceborne vehicle. The alignment platform computer 34, then commands via routing 36, the 3-axis dynamic rotational platform 38, in which the pilot sits, to "align" the PMA of the pilot to the G-force accelerative vector. This platform 38, is high speed motion rotational on 3-axis, thereby able to position the pilot anywhere in 360 degree spheroidal space about the platform. Since the 3-axis dynamic rotational platform 38, will move to match the pilots PMA with the G-force acceleration vector common from the alignment platform control computer 34, a position feedback loop 40, is necessary to inform the alignment platform control computer 34, when the 3-axis dynamic rotation platform is matched to the command.

The 3-axis dynamic rotational platform 38, in which the pilot sits is itself spheroid in shape. The invention requires utmost visibility, and much of this sphere is transparent. Since equipment can be damaged in flight, a home feature is provided for the pilot to home the 3-axis dynamic rotational platform either up for ejection, or home down for ejection. The "home" feature can also be utilized to fly the aerial vehicle conventionally.

During warfare, the invention can be pre-programmed to accept different high performance maneuvers that the alignment platform control computer 34, can command the aerial vehicle to perform. During these pre-programmed maneuvers, the alignment platform control computer will command the 3-axis dynamic rotational platform to pre-position the PMA of the pilot to the intended (known) G-force acceleration vector. This sequencing of pre-programmed maneuvers can give the pilot almost limitless choices of high 20+G evasive maneuvers.

I claim:

1. An integrated progressive G-force alignment platform system comprising a mechanism for matching a PMA of a pilot positioned on the alignment platform system to an accelerative G-force vector.

2. The system of claim 1 wherein the mechanism is pre-programmed to match the pilot's PMA to the G-force vector.

3. The system of claim 1 wherein the mechanism makes in-flight calculations to determine the G-force vector.

4. The integrated G-force alignment platform system of claim 1 wherein the mechanism for matching the PMA of the pilot to the accelerative G-force vector comprises an alignment control computer that commands the platform to move within 360 degrees of spheroidal space.

5. A device for enabling a pilot to maintain a conscious state while performing maneuvers in an aircraft that impose a high G-force, comprising:

a platform radially movable about an axis;

a seat for positioning the pilot on the platform at the axis; and a mechanism for moving the platform in order to optimize the position of the pilot with respect to the G-force so that the pilot maintains the conscious state.

6. The device of claim 5 and further comprising a mechanism for matching a PMA of the pilot to an accelerative G-force vector.

7. The device of claim 6 and further comprising sensors for measuring the G-force vector.

8. The device of claim 7 wherein the sensors provide data to the computer that permit the computer to calculate the G-force vector location within 360 degrees of spheroidal space around the pilot.

9. The device of claim 5 and further comprising sensors for sensing a G-force acceleration vector.

10. The device of claim 9 and further comprising an alignment platform computer that receives data from the sensors and commands the platform to align the PMA of the pilot to the G-force accelerative vector.

11. The device of claim 10 wherein the computer is pre-programmed to command alignment of the platform based upon a pre-configured flight plan.

12. The device of claim 5 and further comprising a seat for the pilot, the seat positioned on the platform.

13. The device of claim 5 wherein the platform is movable within 360 degrees.

14. The device of claim 5 wherein the pilot can command the mechanism to adjust position of the platform up or down for ejection or for conventional flight.

* * * * *